United States Patent
Sasai et al.

(10) Patent No.: US 12,005,899 B2
(45) Date of Patent: Jun. 11, 2024

(54) VEHICLE WITH INTER-VEHICULAR DISTANCE ACCELERATION CONTROL

(71) Applicant: Panasonic Corporation, Osaka (JP)

(72) Inventors: Hiroyuki Sasai, Osaka (JP); Hiroyuki Uematsu, Osaka (JP); Takeshi Ando, Kyoto (JP); Duyhinh Nguyen, Chiba (JP)

(73) Assignee: PANASONIC HOLDINGS CORPORATION, Osaka (JP)

(*) Notice: Subject to any disclaimer, the term of this patent is extended or adjusted under 35 U.S.C. 154(b) by 93 days.

(21) Appl. No.: 17/430,401

(22) PCT Filed: Feb. 4, 2020

(86) PCT No.: PCT/JP2020/004133
§ 371 (c)(1),
(2) Date: Aug. 12, 2021

(87) PCT Pub. No.: WO2020/166433
PCT Pub. Date: Aug. 20, 2020

(65) Prior Publication Data
US 2022/0105935 A1    Apr. 7, 2022

(30) Foreign Application Priority Data
Feb. 14, 2019  (JP) ................................. 2019-024312

(51) Int. Cl.
*B60W 30/165*    (2020.01)
(52) U.S. Cl.
CPC ..... *B60W 30/165* (2013.01); *B60W 2720/106* (2013.01); *B60W 2754/30* (2020.02)

(58) Field of Classification Search
CPC ......... B60W 30/165; B60W 2720/106; B60W 2754/30; B60W 2540/00; B60W 60/0025; B60W 30/16; G08G 1/22
See application file for complete search history.

(56) References Cited

U.S. PATENT DOCUMENTS

2017/0080940 A1*  3/2017  Ito .......................... B60W 10/18

FOREIGN PATENT DOCUMENTS

| DE | 102007029483 A1 | 1/2009 |
|---|---|---|
| DE | 102010020047 A1 | 1/2011 |

(Continued)

OTHER PUBLICATIONS

International Search Report issued in Patent Application No. PCT/JP2020/004133 dated Mar. 31, 2020.

(Continued)

*Primary Examiner* — Isaac G Smith
*Assistant Examiner* — Nikki Marie M Molina
(74) *Attorney, Agent, or Firm* — PEARNE & GORDON LLP

(57) ABSTRACT

The present invention provides a vehicle with which it is possible to realize stable platoon travel. This vehicle (100) travels autonomously by following a leading vehicle while maintaining a prescribed distance between vehicles, wherein the vehicle (100) has: a detection unit (110) that detects moving bodies present around the vehicle; and a control unit (160) that determines an entering moving body, among the moving bodies detected by the detection unit (110), that may enter an area between the vehicle and the leading vehicle, and causes the vehicle to accelerate or decelerate on the basis of the distance between the entering moving body and the area.

7 Claims, 6 Drawing Sheets

(56) References Cited

FOREIGN PATENT DOCUMENTS

| | | |
|---|---|---|
| DE | 102014209520 A1 | 11/2015 |
| DE | 102016106983 A1 | 10/2017 |
| JP | 5101133 B2 | 12/2012 |
| JP | 2017-128178 A | 7/2017 |
| JP | 2017185855 A * | 10/2017 |
| JP | 2019-191882 A | 10/2019 |

OTHER PUBLICATIONS

Extended European search report issued in European Patent Application No. 20755046.8 dated Mar. 14, 2022.

* cited by examiner

VEHICLE WITH INTER-VEHICULAR DISTANCE ACCELERATION CONTROL

TECHNICAL FIELD

The present disclosure relates to a vehicle that automatically travels while following a vehicle ahead.

BACKGROUND ART

For example, Patent Literature (hereinafter, referred to as "PTL") 1 discloses an automatic traveling vehicle that travels in a platoon while following a leading vehicle. This automatic traveling vehicle accelerates or decelerates in accordance with acceleration in a direction perpendicular to a traveling direction (i.e., a vehicle width direction of the automatic traveling vehicle). This allows the automatic traveling vehicle to travel stably even in a state where a vehicle type differs between the automatic traveling vehicle and the leading vehicle, thus causing a difference in a centrifugal force or a traveling trajectory at a curve are generated.

CITATION LIST

Patent Literature

PTL 1: Japanese Patent No. 5101133

SUMMARY OF INVENTION

Technical Problem

The automatic traveling vehicle disclosed in PTL 1, however, stops traveling in a case where another moving body (e.g., a human) enters between the automatic traveling vehicle and the leading vehicle. This causes a problem in which a platoon is divided and stable platoon traveling fails.

An object of an aspect of the present disclosure is to provide a vehicle capable of performing stable platoon traveling.

Solution to Problem

A vehicle according to an aspect of the present disclosure is a vehicle that automatically travels while following a preceding vehicle and keeping a predetermined inter-vehicle distance, the vehicle includes: a detector that detects a moving body present around the vehicle; and a controller that determines, from among at least one of a plurality of the moving bodies detected by the detector, an entering moving body that possibly enters an area between the preceding vehicle and the vehicle, the controller accelerating or decelerating the vehicle based on a distance between the entering moving body and the area.

Advantageous Effects of Invention

According to the present disclosure, it is possible to provide a vehicle capable of performing stable platoon traveling.

DESCRIPTION OF EMBODIMENTS

Figure 1A:
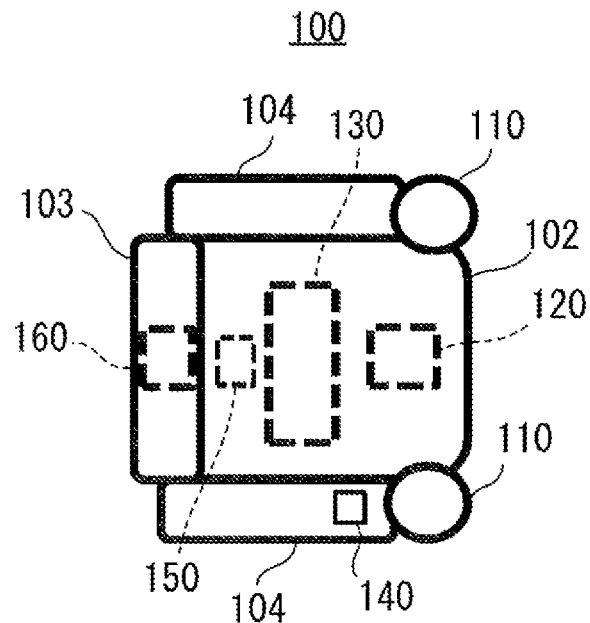
FIG. 1A is a schematic view of an upper surface of a vehicle according to an embodiment of the present disclosure.

Hereinafter, an embodiment of the present disclosure will be described with reference to the accompanying drawings. Note that, in all the drawings, an element the same as a precedent element is given the same reference numeral, and the description thereof may be omitted.

Firstly, a description will be given of vehicle 100 according to the embodiment of the present disclosure with reference to FIGS. 1A, 1B, and 2.

FIG. 1A is a schematic view of an upper surface of vehicle 100. FIG. 1B is a schematic view of a right side surface of vehicle 100. FIG. 2 is a block diagram illustrating an exemplary configuration of vehicle 100.

Figure 4:
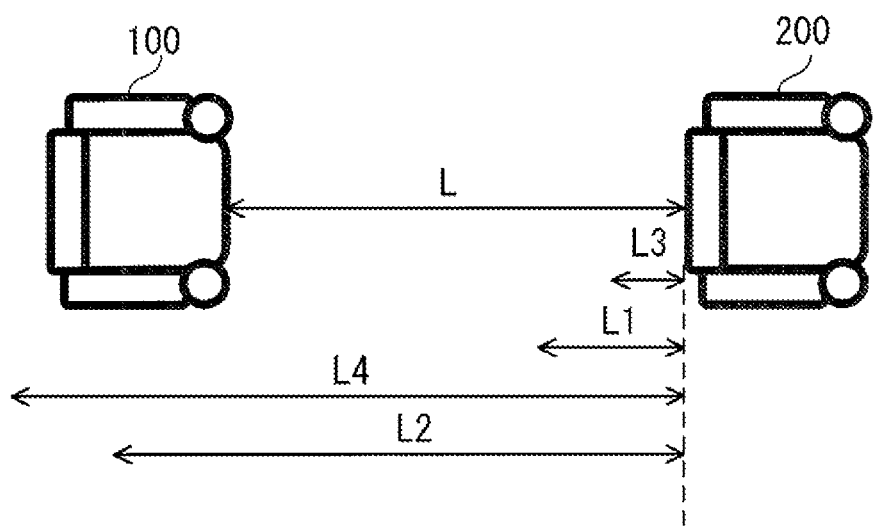
FIG. 4 is a schematic view of examples of respective inter-vehicle distances according to the embodiment of the present disclosure.

Vehicle 100 is a vehicle capable of automatically traveling while following a preceding vehicle (e.g., vehicle 200 illustrated in FIG. 4) while keeping a predetermined inter-vehicle distance (e.g., inter-vehicle distance L illustrated in FIG. 4). Vehicle 100 is also an electric vehicle.

Vehicle 100 has a wheelchair-type structure on which a person can ride. Specifically, as illustrated in FIGS. 1A and 1B, vehicle 100 includes frame 101, sitting seat 102, backrest 103, armrests 104, and wheels 105.

Figure 1B:
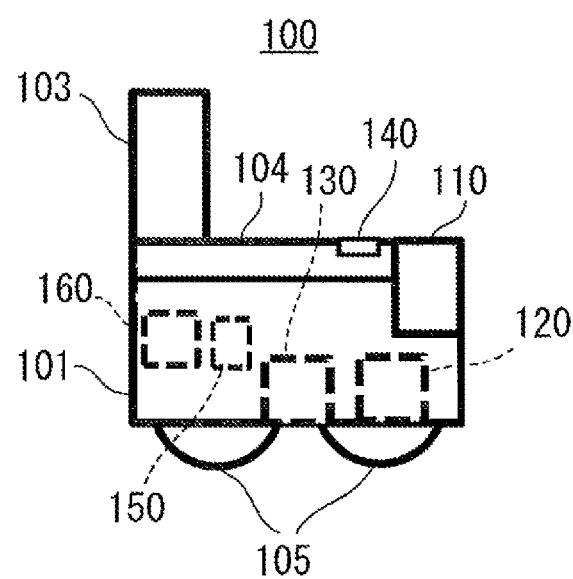
FIG. 1B is a schematic view of a right side surface of the vehicle according to the embodiment of the present disclosure.
Figure 2:
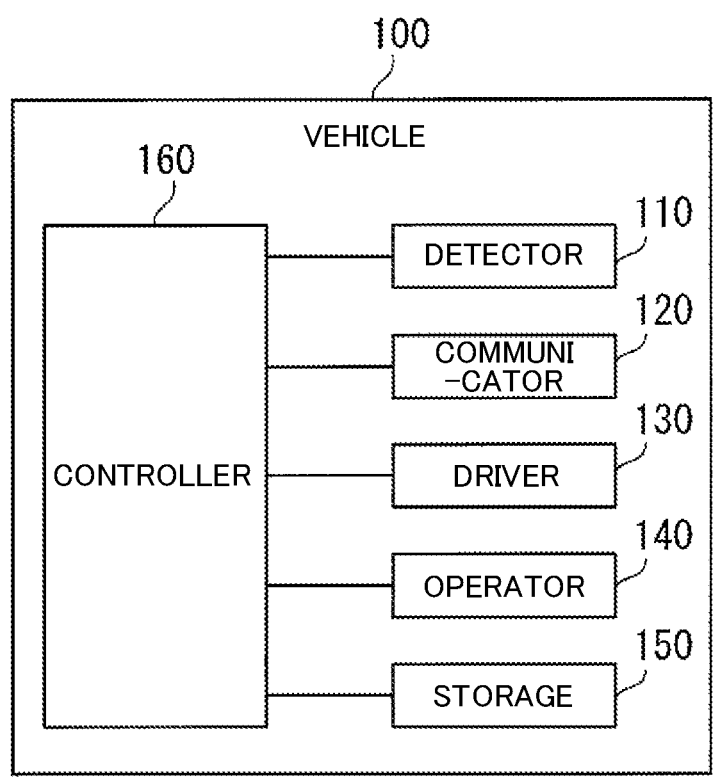
FIG. 2 is a block diagram illustrating an exemplary configuration of the vehicle according to the embodiment of the present disclosure.

Also, as illustrated in FIGS. 1A, 1B and 2, vehicle 100 includes detectors 110, communicator 120, driver 130, operator 140, storage 150, and controller 160.

Detectors 110 each detect a moving body (e.g., human or another vehicle) around vehicle 100 (e.g., in front/rear and left/right directions). The range in which the moving body can be detected is preset, and includes, for example, a circular, semicircular, or rectangular area with vehicle 100 as a center (or, may be a reference point set in the vicinity of vehicle 100). Incidentally, detector 110 can detect the moving body during either platoon traveling, automatic traveling by vehicle 100 alone, or stopping.

Detector 110 also measures a distance between the moving body and vehicle 100 and an angle indicating a presence direction of the moving body with respect to a traveling direction of vehicle 100.

As detector 110, a device such as a laser sensor, an ultrasound sensor, or a millimeter wave sensor can be used, but detector 110 is not limited to these sensors.

Communicator 120 communicates with an external apparatus. Examples of the external apparatus include another communicator mounted on a preceding vehicle which vehicle 100 follows during platoon traveling, another communicator mounted on a following vehicle which follows vehicle 100 during platoon traveling, or a terminal apparatus that transmits positional information on the preceding vehicle.

Examples of information to be received by communicator 120 includes, for example, speed information and positional information on each of the preceding vehicle and following vehicle. Moreover, information to be transmitted by communicator 120 includes, for example, speed information and positional information on vehicle 100. Incidentally, communicator 120 can communicate with the external apparatus during either platoon traveling, automatic traveling by vehicle 100 alone, or stopping.

As a communication method of communicator 120, for example, Wi-Fi (registered trademark), Bluetooth (registered trademark), a radio communication such as millimeter-waves, an optical communication such as infrared rays, or an ultrasound communication can be used, but the communication method is not limited to these methods.

Driver 130, under the control of controller 160, rotates and/or steers wheel(s) 105 to make vehicle 100 travel.

Operator 140 accepts a user operation. The user operation includes, for example, an operation instructing performance of platoon traveling or autonomous traveling and/or an operation setting the presence or absence of an occupant in vehicle 100. Note that, operator 140 is not an essential component of vehicle 100.

Storage 150 stores, for example, information indicating predetermined various regions (see FIG. 3) and information indicating predetermined various inter-vehicle distances (see FIG. 4). The various regions and inter-vehicle distances will be described in detail later.

Controller 160 reads information from storage 150 as appropriate according to an operation content received by operator 140 and/or a detection result of detector 110, performs processing based on the information, and controls communicator 120 and driver 130. The operation of controller 160 will be described in detail later.

Incidentally, although not illustrated in FIGS. 1A, 1B, and 2, controller 160 includes, for example, a Central Processing Unit (CPU), a storage medium such as a Read Only Memory (ROM) storing a control program, a working memory such as a Random Access Memory (RAM), and hardware such as a communication circuit. The functions of controller 160 to be described later are realized by, for example, the CPU reading and executing the control program stored in the memory.

The configuration of vehicle 100 has been described above.

Next, predetermined first set area A1 and second set area A2 will be described with reference to FIG. 3.

Figure 3:
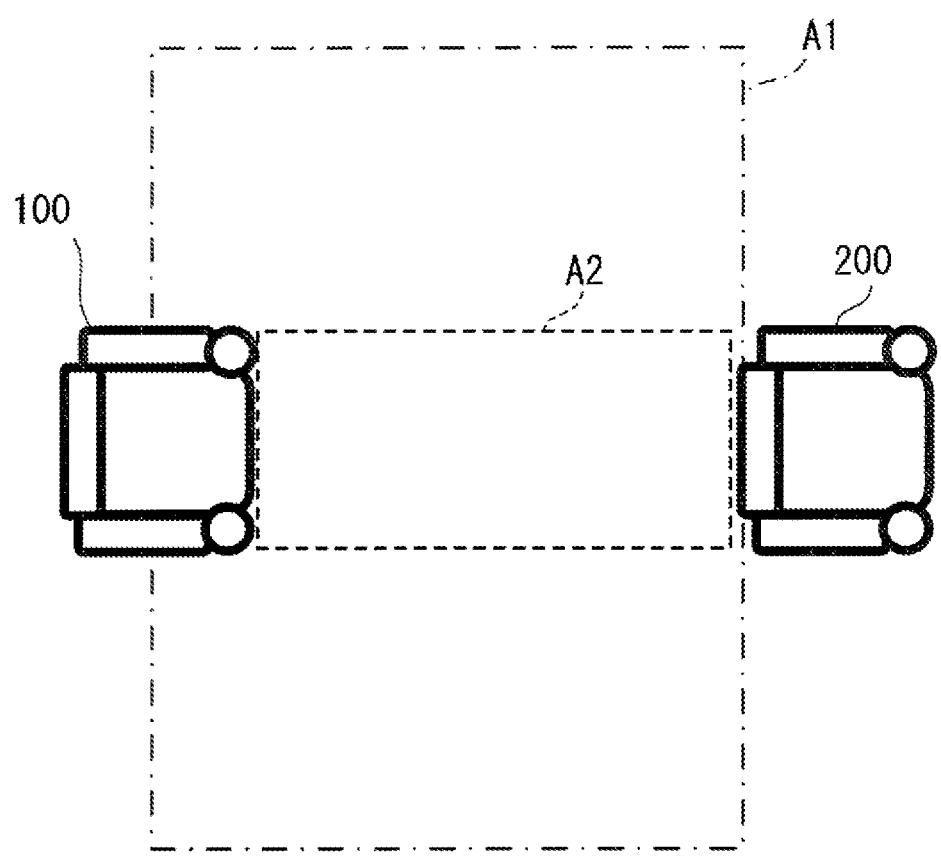
FIG. 3 is a schematic view of examples of a first set area and a second set area according to the embodiment of the present disclosure.

FIG. 3 is a schematic view of examples of first set area A1 and second set area A2. FIG. 3 illustrates a state where vehicle 200 (exemplary preceding vehicle) travels in front of vehicle 100 and vehicle 100 follows vehicle 200, as seen from directly above. FIG. 3 also illustrates a state where vehicle 200 and vehicle 100 are traveling from left to right in the figure.

First set area A1 and second set area A2 are regions which are predetermined with reference to vehicle 100. Second set area A2 is an area between vehicle 200 and vehicle 100. First set area A1 is an area excluding second set area A2.

When vehicle 100 is traveling in a platoon while following vehicle 200, controller 160 determines, from among moving bodies (not illustrated) detected by detector 110, a moving body present in first set area A1 as an entering moving body. The entering moving body is a moving body that may enter second set area A2.

In addition, controller 160 also controls driver 130 to stop the traveling of vehicle 100 in a case where a moving body (not illustrated) detected by detector 110 enters second set area A2 when vehicle 100 travels in a platoon while following vehicle 200.

Sizes and shapes of first set area A1 and second set area A2 are not limited to the sizes and shapes illustrated in FIG. 3. Moreover, first set area A1 may be the same as or different from a range in which detector 110 can detect a moving body.

First set area A1 and second set area A2 have been described above.

Next, predetermined inter-vehicle distance L, first inter-vehicle distance L1, second inter-vehicle distance L2, third inter-vehicle distance L3, and fourth inter-vehicle distance L4 will be described with reference to FIG. 4.

FIG. 4 is a schematic view of examples of inter-vehicle distance L, first inter-vehicle distance L1, second inter-vehicle distance L2, third inter-vehicle distance L3, and fourth inter-vehicle distance L4. FIG. 4 illustrates a state of vehicle 200 and vehicle 100 following vehicle 200, as seen from directly above. FIG. 4 also illustrates a state where vehicle 200 and vehicle 100 are traveling from left to right in the figure.

Inter-vehicle distance L is an inter-vehicle distance that is kept when vehicle 100 travels in a platoon while following vehicle 200.

First inter-vehicle distance L1, second inter-vehicle distance L2, third inter-vehicle distance L3, and fourth inter-vehicle distance L4 are inter-vehicle distances that are changed from inter-vehicle distance L in a case where an entering moving body is detected while vehicle 100 is traveling in a platoon while following vehicle 200. Inter-vehicle distance L is, for example, the same as a longitudinal length of second set area A2 illustrated in FIG. 3.

First inter-vehicle distance L1 and third inter-vehicle distance L3 are smaller (shorter) than inter-vehicle distance L. Moreover, third inter-vehicle distance L3 is smaller than first inter-vehicle distance L1.

Further, first inter-vehicle distance L1 is, for example, a distance not causing the occupant of vehicle 100 to feel anxious that vehicle 100 may rear-end vehicle 200.

Second inter-vehicle distance L2 and fourth inter-vehicle distance L4 are greater (longer) than inter-vehicle distance L. Moreover, fourth inter-vehicle distance L4 is greater than second inter-vehicle distance L2.

Further, second inter-vehicle distance L2 is, for example, a distance not causing the occupant of vehicle 100 to feel anxious that vehicle 100 may be left behind without following vehicle 200.

Inter-vehicle distance L, first inter-vehicle distance L1, second inter-vehicle distance L2, third inter-vehicle distance L3, and fourth inter-vehicle distance L4 have been described above.

Next, an operation of vehicle 100 will be described with reference to FIG. 5.

Figure 5:
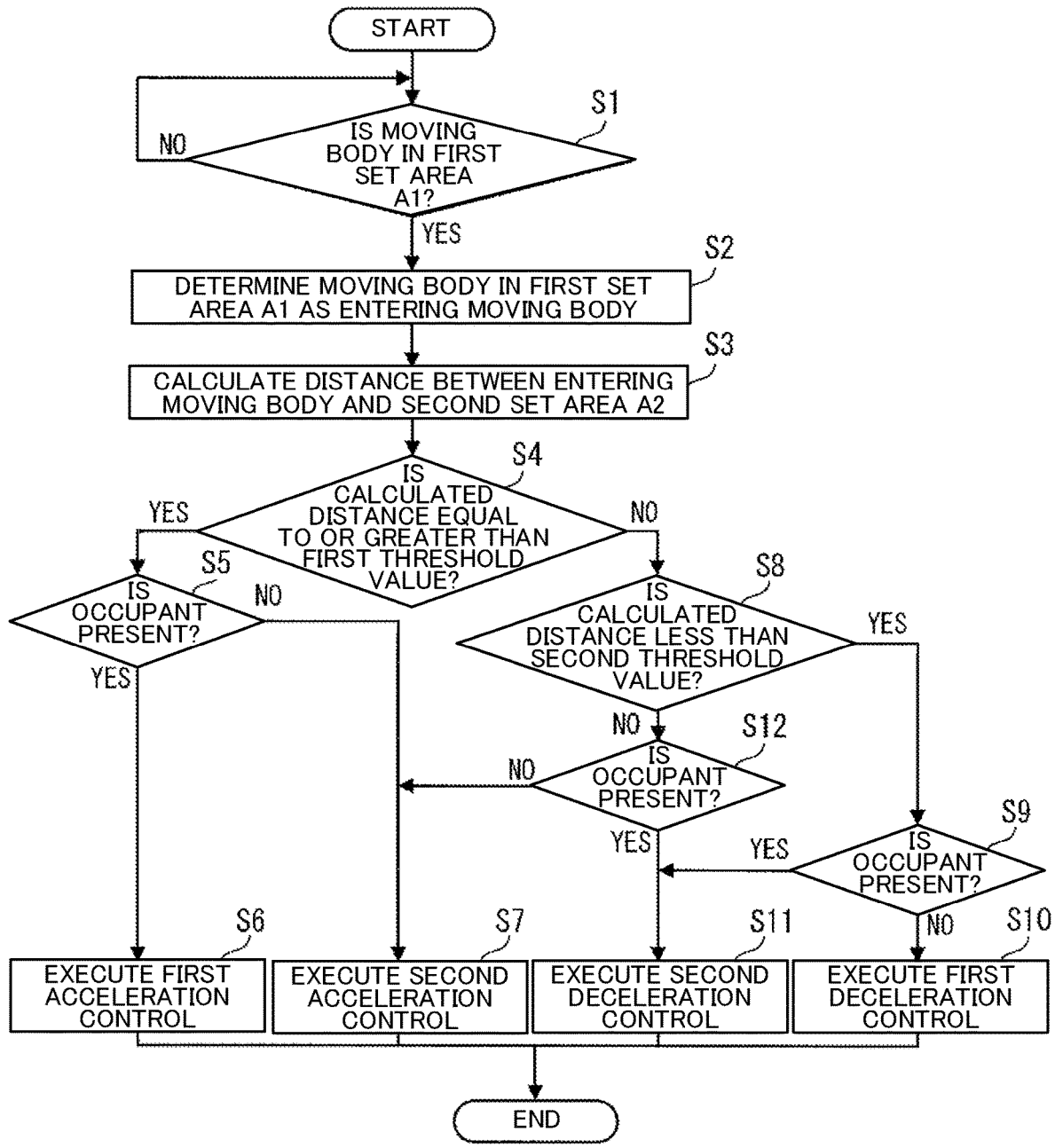
FIG. 5 is a flowchart illustrating an exemplary operation of the vehicle according to the embodiment of the present disclosure.

FIG. 5 is a flowchart illustrating an exemplary operation of vehicle 100. The operation illustrated in FIG. 5 is started when, for example, operator 140 of vehicle 100 performs the operation instructing the execution of platoon traveling, and vehicle 100 starts traveling in a platoon while following vehicle 200 (see FIGS. 3, 4).

First, controller 160 determines whether a moving body is present in first set area A1 (see FIG. 3) from among the moving bodies detected by detector 110 (step S1).

In a case where the moving body is not present in first set area A1 (step S1: NO), the flow returns to step S1.

On the other hand, in a case where a moving body is present in first set area A1 (step S1: YES), controller 160 determines the moving body in first set area A1 as an entering moving body (step S2). As described above, the entering moving body is a moving body that may enter second set area A2 (see FIG. 3).

Next, controller 160 calculates a distance between the entering moving body and second set area A2 (step S3).

Figure 6:
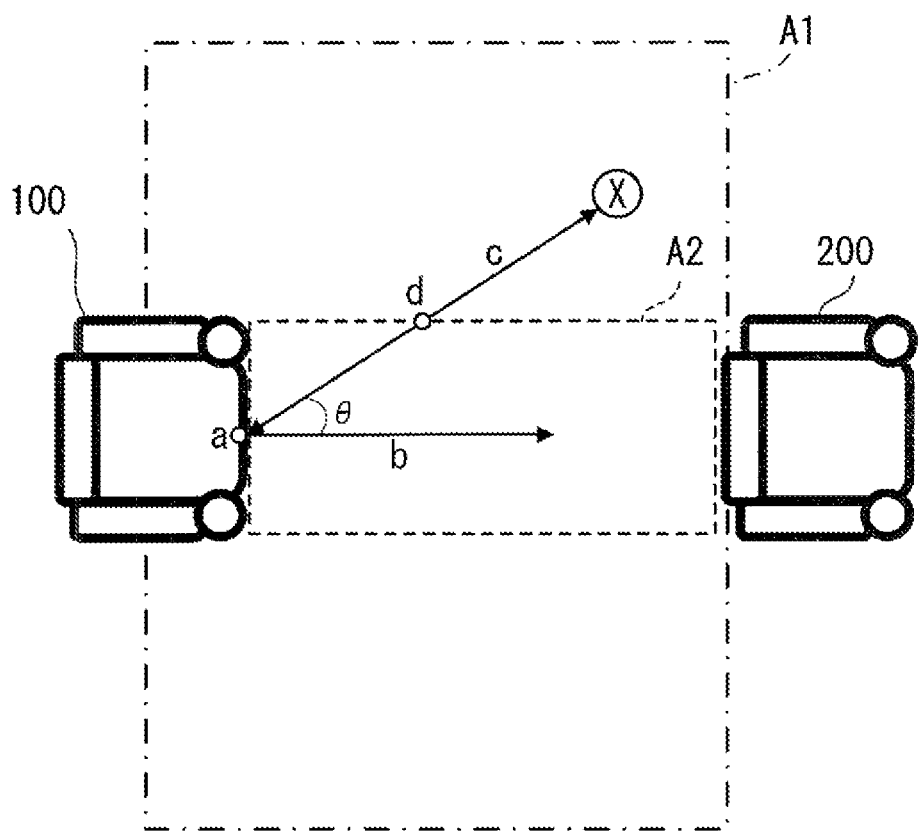
FIG. 6 is a schematic view of an exemplary positional relationship between the vehicle and an entering moving body according to the embodiment of the present disclosure.

Here, calculation processing of step S3 will be described with reference to FIG. 6. FIG. 6 is a schematic view of an exemplary positional relationship between vehicle 100 and entering moving body X. FIG. 6 illustrates a state of vehicle 200, vehicle 100 traveling in a platoon while following vehicle 200, and entering moving body X, as seen from directly above. FIG. 6 also illustrates a state where vehicle 200 and vehicle 100 are traveling from left to right in the figure.

In FIG. 6, central point "a" is a central point of a vehicle width direction of vehicle 100 (up/down direction in the figure). Moreover, straight line "b" is a straight line indicating the traveling direction of vehicle 100 (right direction in the figure) starting from central point "a." Central point "a" and straight line "b" are known to controller 160.

Furthermore, in FIG. 6, distance "c" is a distance between central point "a" and entering moving body X. Angle "θ" is an angle indicating a presence direction of entering moving body X with respect to the traveling direction of vehicle 100 (straight line "b"). Distance "c" and angle "θ" are measured by detector 110 and notified to controller 160.

Controller 160 calculates a distance between central point "a" and intersection "d" based on central point "a", straight line "b", distance "c", and angle "θ", which are described above. Intersection "d" is an intersection of a straight line connecting between central point "a" and entering moving body X (straight line indicating distance "c"), and an outer edge part of second set area A2.

Controller 160 then subtracts the distance between central point "a" and intersection "d" from distance "c" to calculate the distance between entering moving body X and second set area A2 (i.e., distance between intersection "d" and entering moving body X). Hereinafter, the distance between entering moving body X and second set area A2 calculated here is referred to as a "calculated distance".

The calculation processing of step S3 has been described above. Hereinafter, the description returns to FIG. 5.

Next, controller 160 determines whether the calculated distance is equal to or greater than a first threshold value (step S4).

In a case where the calculated distance is equal to or greater than the first threshold value (step S4: YES), controller 160 determines whether an occupant is present in vehicle 100 (step S5).

The presence or absence of the occupant is set by, for example, the user operation prior to a stat of platoon traveling. For example, before performing the operation instructing the execution of platoon traveling, the user performs an operation setting the presence or absence of the occupant in operator 140 of vehicle 100.

In a case where the occupant is present in vehicle 100 (step S5: YES), controller 160 executes the first acceleration control (step S6).

The first acceleration control is a control accelerating vehicle 100 so that inter-vehicle distance L becomes first inter-vehicle distance L1 (see FIG. 4). This enables reducing the inter-vehicle distance between vehicle 100 and vehicle 200, thereby making it possible to prevent the entering moving body from entering between vehicle 100 and vehicle 200. As a result, the platoon is not divided, and vehicle 100 can perform the stable platoon traveling. In addition, since first inter-vehicle distance L1 is used, the occupant of vehicle 100 does not feel anxious that vehicle 100 may rear-end vehicle 200 when the first acceleration control is executed.

In a case where the occupant is not present in vehicle 100 (step S5: NO), controller 160 executes the second acceleration control (step S7).

The second acceleration control is a control accelerating vehicle 100 so that inter-vehicle distance L becomes third inter-vehicle distance L3 (see FIG. 4). This enables reducing the inter-vehicle distance between vehicle 100 and vehicle 200, and thereby it is possible to prevent the entering moving body from entering between vehicle 100 and vehicle 200. As a result, the platoon is not divided, and vehicle 100 can perform the stable platoon traveling. In addition, since third inter-vehicle distance L3, which is smaller than first inter-vehicle distance L1, is used, the entry of the entering moving body between vehicle 100 and vehicle 200 can be prevented more effectively.

On the other hand, in a case where the calculated distance is less than the first threshold value (step S4: NO), controller 160 determines whether the calculated distance is less than the second threshold value, which is smaller than the first threshold value (step S8).

In a case where the calculated distance is less than the second threshold value (step S8: YES), controller 160 determines whether an occupant is present in vehicle 100 (step S9).

In a case where the occupant is present in vehicle 100 (step S9: YES), controller 160 executes the second deceleration control (step S11).

The second deceleration control is a control decelerating vehicle 100 so that inter-vehicle distance L becomes second inter-vehicle distance L2 (see FIG. 4). This enables increasing the inter-vehicle distance between vehicle 100 and vehicle 200, and thereby the entering moving body can pass through between vehicle 100 and vehicle 200 without colliding with vehicle 100. As a result, the platoon is not divided, and vehicle 100 can perform the stable platoon traveling. In addition, since second inter-vehicle distance L2 is used, the occupant of vehicle 100 does not feel anxious that vehicle 100 may be left behind without following vehicle 200 when the second deceleration control is executed.

On the other hand, in a case where the occupant is not present in vehicle 100 (step S9: NO), controller 160 executes the first deceleration control (step S10).

The first deceleration control is a control decelerating vehicle 100 so that inter-vehicle distance L becomes fourth inter-vehicle distance L4 (see FIG. 4). This enables increasing the inter-vehicle distance between vehicle 100 and vehicle 200, and thereby the entering moving body can pass through between vehicle 100 and vehicle 200 without colliding with vehicle 100. As a result, the platoon is not divided, and vehicle 100 can perform the stable platoon traveling. In addition, since fourth inter-vehicle distance L4, which is greater than second inter-vehicle distance L2, is used, the entering moving body can pass through between vehicle 100 and vehicle 200 with more margin.

In a case where the calculated distance is not less than the second threshold value (step S8: NO), controller 160 determines whether an occupant is present in vehicle 100 (step S12).

In a case where the occupant is present in vehicle 100 (step S12: YES), controller 160 executes the second deceleration control described above (step S11). Since the operational effect of the second deceleration control has been described above, a description thereof is omitted here.

On the other hand, in a case where the occupant is not present in vehicle 100 (step S12: NO), controller 160 executes the second acceleration control described above (step S7). Since the operational effect of the second acceleration control has been described above, a description thereof is omitted here.

The operation of vehicle 100 has been described above.

As described in detail, vehicle 100 of the present embodiment is a vehicle that automatically travels while following vehicle 200 and keeping a predetermined inter-vehicle distance, determines, from among moving bodies detected around vehicle 100, an entering moving body that may enter second set area A2 between vehicle 200 and vehicle 100, and accelerates or decelerates vehicle 100 based on the distance between the entering moving body and second set area A2. Executing the control accelerating vehicle 100 can prevent the entering moving body from entering between vehicle 100 and vehicle 200 whereas executing the control decelerating vehicle 100 allows the entering moving body to pass through between vehicle 100 and vehicle 200, and thus, the platoon is not divided. As a result, vehicle 100 can perform the stable platoon traveling.

Besides, in vehicle 100 of the present embodiment, when the control accelerating vehicle 100 is executed while an occupant is in vehicle 100, the occupant of vehicle 100 does not feel anxious that vehicle 100 may rear-end vehicle 200.

Moreover, in vehicle 100 of the present embodiment, when the control decelerating vehicle 100 is executed while an occupant is in vehicle 100, the occupant of vehicle 100 does not feel anxious that vehicle 100 may be left behind without following vehicle 200.

Note that, the present disclosure is not limited to the above-described embodiments, and various modifications can be made without departing from the spirit thereof. Hereinafter, modifications will be described.

[Modification 1]

Plural kinds of first inter-vehicle distances L1, second inter-vehicle distance L2, third inter-vehicle distances L3, and fourth inter-vehicle distances L4 may be prepared and selected depending on, for example, a degree of crowding in a place where vehicle 100 travels and/or the maximum speed allowed in a position where vehicle 100 travels. In addition, this selection may be made by, for example, a user operation or controller 160. In the latter case, for example, controller 160 may make the selection based on information indicating the degree of crowding and/or information indicating the allowable maximum speed, which are/is received by communicator 120.

[Modification 2]

In the above embodiment, a description has been given with an example in which the moving body present in first set area A1 is determined as the entering moving body; however, the present disclosure is not limited to this.

For example, controller 160 may determine, from among moving bodies detected by detector 110 (or moving bodies in first set area A1), a moving body that is moving toward second set area A2, as the entering moving body.

More specifically, controller 160 may determine as the entering moving body, from among moving bodies detected by detector 110 (or moving bodies in first set area A1), a moving body with an angle formed by straight line "b" illustrated in FIG. 6 and a line including a vector indicating a moving direction of the moving body in a predetermined unit time is equal to or greater than a predetermined angle, and with the line that includes the vector and intersects straight line "b" illustrated in FIG. 6 in a predetermined time unit.

[Modification 3]

In the above embodiment, a description has been given with an example in which the presence or absence of the occupant in vehicle 100 is set by the user; however, the present disclosure is not limited to this.

For example, vehicle 100 may be equipped with a sensor capable of detecting the presence or absence of an occupant in vehicle 100 (e.g., weight sensor or infrared sensor). Controller 160 may determine whether the occupant is present in vehicle 100 based on a detection result of the sensor (e.g., steps S5, S9 and S12 of FIG. 5).

[Modification 4]

Controller 160 may control communicator 120 to transmit control information instructing deceleration or stopping with respect to vehicle 200 in a case where an inter-vehicle distance between vehicle 100 and vehicle 200 becomes a predetermined value or more. Vehicle 200 that has received this control information decelerates or stops. Thus, a platoon between vehicle 100 and vehicle 200 can be kept.

[Modification 5]

Controller 160 may control speed of vehicle 100 based on speed information on vehicle 200, which is received by communicator 120 from vehicle 200, for the purpose of traveling while keeping inter-vehicle distance L. This enables controlling the speed of vehicle 100 accurately and performing the stable platoon traveling.

[Modification 6]

Controller 160 may control the speed of vehicle 100 in accordance with a predetermined speed at a position where vehicle 100 travels. A specific example in this case will be described below.

Vehicle 100 includes a current position detector for detecting a current position of vehicle 100 (not illustrated). The current position detector may be, for example, a Global Positioning System (GPS) receiver or a beacon receiver. In addition, storage 150 stores map information in which the speed is set for each position. In this map information, for example, the speed below the walking speed of human is determined for a place where many people are assumed to be present.

Controller 160 identifies a position corresponding to the current position detected by the current position detector in the map information read from storage 150 and controls driver 130 such that vehicle 100 travels at a speed determined in the position.

Incidentally, the description above has been given with an example in which the map information is stored in storage 150, but the map information may be received by communicator 120 from an external apparatus.

[Modification 7] Controller 160 may output a warning sound from a speaker mounted on vehicle 100 (not illustrated) or turn on an indication lamp mounted on vehicle 100 (not illustrated) toward the entering moving body. This allows the entering moving body to clearly recognize the presence of vehicle 100. Thus, the entering moving body can easily avoid entering second set area A2.

Incidentally, vehicle 100 is preferably provided with the speakers and/or indication lamps on both left and right sides of vehicle 100. This allows the occupant of vehicle 100 to recognize the presence direction of the entering moving body as well as allows the entering moving body to recognize the presence of vehicle 100.

[Modification 8]

Operator 140 may receive an operation in which the occupant indicates the traveling direction and speed of vehicle 100. For example, when the operator receives the above operation during platoon traveling, controller 160 controls driver 130 such that vehicle 100 stops following vehicle 200 and travels to the indicated traveling direction at the indicated speed.

In the manner described above, for example, when an emergency occurs during platoon traveling, it is possible to perform traveling reflecting an intention of the occupant, and thus the safety can be secured. Incidentally, when the above operation ends, controller 160 may control driver 130 to return to the platoon traveling state based on a communication between vehicle 200 and communicator 120.

[Modification 9]

Controller 160 may execute the acceleration or deceleration control depending on a degree of anxiety (tension) of the occupant in a case where an occupant is present in vehicle 100 during platoon traveling.

In this case, controller 160 determines the degree of anxiety of the occupant based on biometric information (e.g., information indicating a pulse of the occupant, an opening degree of a pupil, or the amount of perspiration) obtained from a predetermined sensor. For example, when a value of the biometric information is greater than a predetermined threshold value, the degree of anxiety of the occupant is determined to be high, and when the value of the biometric information is equal to or less than the predetermined threshold value, the degree of anxiety of the occupant is determined to be low.

In a case where the degree of anxiety of the occupant is low, controller 160 executes, in step S6 of FIG. 5, the second acceleration control of step S7 instead of the first acceleration control. That is, controller 160 accelerates vehicle 100 so that inter-vehicle distance L becomes third inter-vehicle distance L3 (see FIG. 4).

Further, in a case where the degree of anxiety of the occupant is high, controller 160 executes, in step S11 of FIG. 5, the first deceleration control of step S10 instead of the second deceleration control. That is, controller 160 decelerates vehicle 100 so that inter-vehicle distance L becomes fourth inter-vehicle distance L4 (see FIG. 4).

[Modification 10]

Vehicle 100 may refer to the setting value of inter-vehicle distances described above in platoon formation at the start of traveling.

Specifically, the presence or absence of an occupant is set for vehicle 100 by, for example, operator 140 at the start of traveling. Vehicle 100 then determines inter-vehicle distance L in between with vehicle 200, which is a following target, based on the presence or absence of the occupant and performs the platoon formation. At this time, in presence of the occupant, inter-vehicle distance L is preferably set to be greater than first inter-vehicle distance L1 and smaller than second inter-vehicle distance L2. On the other hand, in absence of the occupant, inter-vehicle distance L is preferably set to be greater than third inter-vehicle distance L3 and smaller than second inter-vehicle distance L2. Moreover, inter-vehicle distance L is preferably set to be smaller when the occupant is absent than when the occupant is present.

The disclosure of Japanese Patent Application No. 2019-024312, filed on Feb. 14, 2019, including the specification, drawings and abstract, is incorporated herein by reference in its entirety.

INDUSTRIAL APPLICABILITY

The vehicle of the present disclosure can be used in an environment where a lot of people move (e.g., indoor and outdoor public spaces) and is useful, for example, in nursing and welfare fields utilizing wheelchairs.

REFERENCE SIGNS LIST 100, 200 Vehicle
101 Frame
102 Sitting seat
103 Backrest
104 Armrest
105 Wheel
110 Detector
120 Communicator
130 Driver
140 Operator
150 Storage
160 Controller

The invention claimed is:

1. A vehicle having a wheelchair-type structure that is used in an environment where people move and that automatically travels while following a preceding vehicle and keeping an inter-vehicle distance at a predetermined inter-vehicle distance, the vehicle comprising:
   a detector that detects a moving body present in a first area around the vehicle, the first area being located outside of a second area between the preceding vehicle and the vehicle; and
   a controller that determines, from among at least one of a plurality of the moving bodies detected by the detector, an entering moving body that possibly enters the second area, and accelerates or decelerates the vehicle based on a distance between the determined entering moving body and the second area,
   wherein the predetermined inter-vehicle distance corresponds to the longitudinal length of the second area, and
   wherein the controller accelerates, when the distance between the determined entering moving body and the second area is equal to or greater than a first threshold value, the vehicle such that the inter-vehicle distance becomes a first inter-vehicle distance which is smaller than the predetermined inter-vehicle distance.

2. The vehicle according to claim 1, wherein
the controller decelerates, when the distance between the determined entering moving body and the second area is less than a second threshold value which is smaller than the first threshold value, the vehicle such that the inter-vehicle distance becomes a second inter-vehicle distance which is greater than the predetermined inter-vehicle distance.

3. The vehicle according to claim 2, wherein
the controller accelerates, when the distance between the determined entering moving body and the second area is equal to or greater than the first threshold value while an occupant is in the vehicle, the vehicle such that the predetermined inter-vehicle distance becomes the first inter-vehicle distance which is smaller than the predetermined inter-vehicle distance, and
the controller accelerates, when the distance between the determined entering moving body and the second area is equal to or greater than the first threshold value while no occupant is in the vehicle, the vehicle such that the predetermined inter-vehicle distance becomes a third inter-vehicle distance which is smaller than the first inter-vehicle distance.

4. The vehicle according to claim 2, wherein
the controller decelerates, when the distance between the determined entering moving body and the second area is less than the second threshold value while an occupant is in the vehicle, the vehicle such that the predetermined inter-vehicle distance becomes the second inter-vehicle distance which is greater than the predetermined inter-vehicle distance, and
the controller decelerates, when the distance between the determined entering moving body and the second area is less than the second threshold value while no occupant is in the vehicle, the vehicle such that the predetermined inter-vehicle distance becomes a fourth inter-vehicle distance which is greater than the second inter-vehicle distance.

5. The vehicle according to claim 2, wherein
the controller decelerates, when the distance between the determined entering moving body and the second area is less than the first threshold value but is equal to or greater than the second threshold value while an occupant is in the vehicle, the vehicle such that the predetermined inter-vehicle distance becomes an inter-vehicle distance which is greater than the predetermined inter-vehicle distance, and
the controller accelerates, when the distance between the determined entering moving body and the second area is less than the first threshold value but is equal to or greater than the second threshold value while no occupant is in the vehicle, the vehicle such that the predetermined inter-vehicle distance becomes an inter-vehicle distance which is smaller than the predetermined inter-vehicle distance.

6. The vehicle according to claim 1, wherein
the controller determines, from among at least one of a plurality of the moving bodies detected by the detector, a moving body that is moving toward the area, as the entering moving body.

7. The vehicle according to claim 1, wherein
the distance between the determined entering moving body and the second area is a distance between an intersection and the determined entering moving body, the intersection being an intersection of a straight line connecting between the vehicle and the determined entering moving body, and an outer edge part of the second area.

* * * * *